(12) United States Patent
Green et al.

(10) Patent No.: US 11,524,345 B2
(45) Date of Patent: Dec. 13, 2022

(54) BORE CUTTING TOOL AND METHOD OF MAKING THE SAME

(71) Applicant: Sandvik Intellectual Property AB, Sandviken (SE)

(72) Inventors: Jamie Green, Wakefield (GB); David Goulbourne, Sheffield (GB)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 284 days.

(21) Appl. No.: 16/220,770

(22) Filed: Dec. 14, 2018

(65) Prior Publication Data
US 2019/0232390 A1    Aug. 1, 2019

Related U.S. Application Data

(63) Continuation of application No. 13/821,354, filed on Apr. 11, 2013, now abandoned.

(51) Int. Cl.
*B23B 51/06*    (2006.01)

(52) U.S. Cl.
CPC .......... *B23B 51/06* (2013.01); *B23B 2228/10* (2013.01); *B23B 2228/105* (2013.01);
(Continued)

(58) Field of Classification Search
CPC .............. B23B 51/06; B23B 2251/248; B23B 2251/44; B23B 2260/072; B23B 27/10; B23B 27/146; B23C 5/28
See application file for complete search history.

(56) References Cited

U.S. PATENT DOCUMENTS 1,355,065 A * 10/1920 Simpson ................. B23B 51/02
                                                                             408/224
2,008,031 A *  7/1935 Miltner ................... B23B 51/02
                                                                              408/56
(Continued)

FOREIGN PATENT DOCUMENTS

DE    102010045388 A1 *  3/2012   ............. B23B 51/00
EP       3115137 A1 *  1/2017   ............. B23B 51/02
(Continued)

OTHER PUBLICATIONS

JP 05-044012 A (human translation) obtained via LinguaLinx Language Solutions, Inc. (May 2020).*

*Primary Examiner* — Ryan Rufo
(74) *Attorney, Agent, or Firm* — Corinne R. Gorski

(57) ABSTRACT

A bore cutting tool for cutting metal workpieces includes a tool substrate and a tool coating on a surface of the tool substrate. The bore cutting tool includes a plurality of pits in the surface of the tool substrate and wherein the tool coating extends over the pits such that the pit surface includes the tool coating. In this way, the pit dimensions can be retained over prolonged tool life and the pits, with their coated surface, are particularly effective at retaining lubricant so that the thickness of a lubricant film can be increased as compared to a tool without the coated pits. In the embodiments, the pits are formed by laser etching and are present only on the cylindrical land. Average pit depth is suitably in the range 8 μm to 25 μm, average pit width and pit length is independently selected from 40 μm to 250 μm and average pit density may be 20 to 30 pits/mm².

13 Claims, 4 Drawing Sheets

(52) U.S. Cl.
CPC ... *B23B 2250/124* (2022.01); *B23B 2260/072* (2013.01); *Y10T 408/78* (2015.01); *Y10T 408/89* (2015.01)

(56) References Cited

U.S. PATENT DOCUMENTS

| | | | | |
|---|---|---|---|---|
| 2,322,894 | A * | 6/1943 | Stevens | B23B 51/02 408/230 |
| 5,022,801 | A * | 6/1991 | Anthony | B23B 51/02 408/144 |
| 5,160,232 | A * | 11/1992 | Maier | B23B 51/02 407/54 |
| 6,524,036 | B1 * | 2/2003 | Kolker | B23B 27/143 409/131 |
| 9,144,845 | B1 * | 9/2015 | Grzina | B23B 27/00 |
| 2004/0253379 | A1 * | 12/2004 | Sugita | B23B 51/02 427/355 |
| 2007/0006694 | A1 * | 1/2007 | Fujimoto | B23B 27/10 82/173 |
| 2015/0328696 | A1 * | 11/2015 | Wang | B23B 51/06 408/57 |

FOREIGN PATENT DOCUMENTS

| | | | | |
|---|---|---|---|---|
| JP | 05044012 | A * | 2/1993 | |
| JP | 2005319544 | A * | 11/2005 | |
| JP | 2012206205 | A * | 10/2012 | |
| WO | WO-2004050314 | A2 * | 6/2004 | B23B 27/10 |
| WO | WO-2007099777 | A1 * | 9/2007 | B23C 5/06 |

* cited by examiner

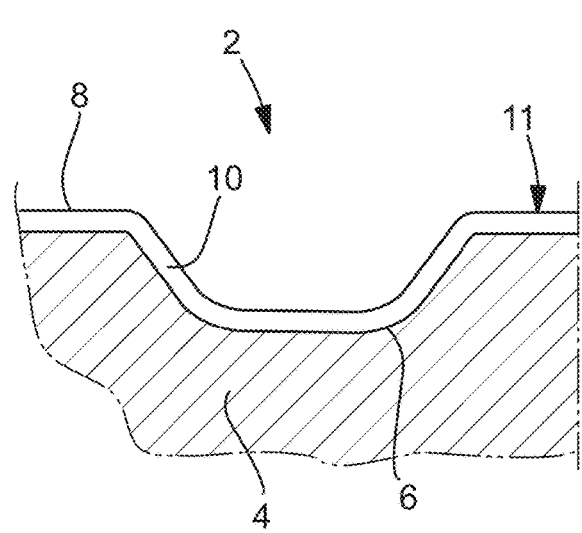
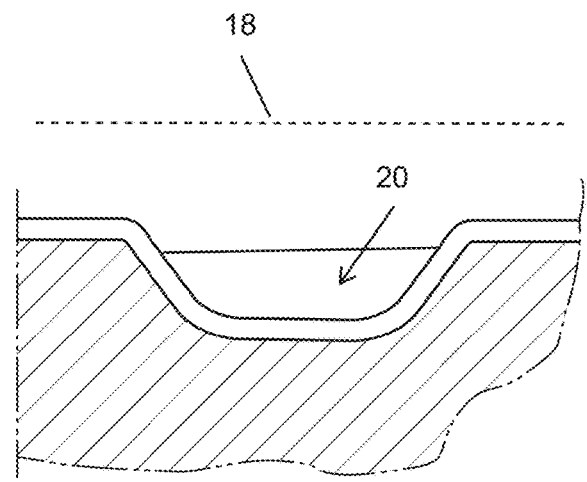
Figure 1A
Figure 1B
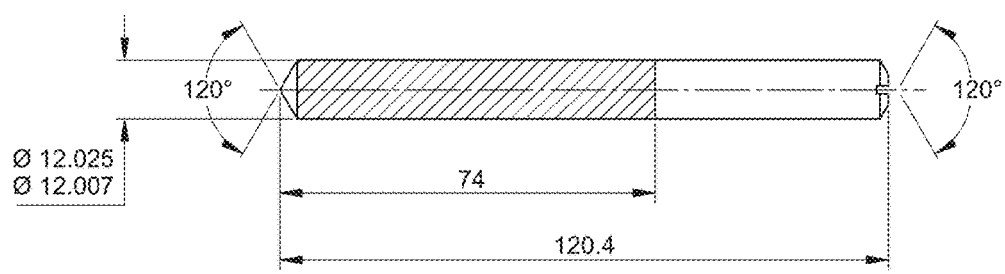
Figure 2

BORE CUTTING TOOL AND METHOD OF MAKING THE SAME

RELATED APPLICATION DATA

This application is a continuation of U.S. patent application Ser. No. 13/821,354 filed Mar. 7, 2013, which is a § 371 National Stage Application of PCT International Application No. PCT/GB2011/001304 filed Sep. 5, 2011, claiming priority of British Application No. 1014966.4, filed Sep. 8, 2010.

TECHNICAL FIELD

The present disclosure relates to bore cutting tools and methods of making such bore cutting tools, in particular such bore cutting tools for metal workpieces, and in particular twist drills.

BACKGROUND

One of the major influences in tool life when machining metals is the lubrication (also referred to as coolant) applied. If a machining process is run 'dry' (without lubrication) the tool life is dramatically reduced when compared to a machining process which has lubrication present.

This is because the lubrication reduces the 'μ' value (coefficient of friction) between the surfaces of contact, i.e. tool and workpiece. Reducing the value of μ leads to a reduction in friction between the contactable surfaces, which consequently leads to a reduction in tool wear and heat generation.

There are four basic forms of lubrication: Hydrodynamic lubrication, where two sliding surfaces are separated by a film of liquid which is held between them by local pressure; elastohydrodynamic lubrication, where two sliding surfaces are separated by a very thin film of fluid which is held between them by higher forms local pressure; mixed lubrication, where two surfaces are partly separated by a liquid film and partly in contact with each other; and boundary lubrication, where two surfaces are mostly in contact with each other, even though there is a fluid present. In boundary lubrication, it is believed that the film thickness between the two surfaces is in the range 0.001 to 0.05 μm [Dwyer-Joyce, R. S (1995) The Tribology Group Institution of Mechanical Engineers, '*Tribological Design Data Part 2: Lubrication*', 2, 10].

It is understood that during metal machining with a bore cutting tool, such as drilling, the type of lubrication present is boundary lubrication where the two surfaces are mostly in contact with each other with very little lubricating fluid.

Accelerated tool wear caused by inefficient lubrication can give rise to reduced tool performance, for example poor hole reproducibility.

Ideally, in order to reduce tool wear, the film thickness needs to be increased between the two surfaces, for example the cylindrical land and the workpiece. Theoretically this will reduce the value of μ at the point of contact between the two surfaces. However, an increase in film thickness is difficult to achieve.

SUMMARY

Embodiments of the present disclosure address the drawbacks discussed above. Existing levels of lubricant usage can be retained whilst improving the lubricating effect. That is, without necessarily increasing the amount of lubricant used during a cutting process, improvements in tool wear can be achieved.

At its most general, the present disclosure proposes that a bore cutting tool is provided with a plurality of pits in a surface of the bore cutting tool wherein a coating is applied over the pits, for retaining lubricant at the surface during use.

In a first aspect, the present disclosure provides a bore cutting tool including a tool substrate; and a tool coating on a surface of the tool substrate, wherein the bore cutting tool comprises a plurality of pits in the surface of the tool substrate and wherein the tool coating follows the contour of each of the plurality of pits.

Excellent performance can be achieved by providing a pit that is formed in the tool substrate and then coated, rather than a pit formed in the coating. Indeed, in experiments, the present inventors found that pits formed after coating, for example by laser etching into the coating, caused damage to the coating in the area around the pit. For example, significant cracking of the coating was observed some distance from the pit. This can lead to premature tool failure. Furthermore, uneven and inconsistent pit dimensions were produced.

A further advantage of the coated pit structure of embodiments of the present disclosure is that the properties of the coating are retained in respect of the surface of the tool between the pits, right up to the periphery of a pit. Furthermore, the advantageous properties of the coating are also provided to the pits themselves because the coating follows the contours of the pits. FIGS. 1A and 1B each illustrate a pit in cross-section, showing the coating extending over the pit surface so as to provide the coating as the pit surface.

With regard to the coating of the pits, that whilst some variation of the coating thickness may be observed in and around the pits (which variation might be attributable to the known corner and edge effects associated with deposition of coatings onto drill geometries), the pits are effectively provided with a coating such that the coating follows the contour of each of the pits. In embodiments this assists in retaining the pit dimensions over prolonged tool life.

A further advantage is that a comparatively smooth pit surface can be achieved by virtue of the coating applied to the pit.

In embodiments of the present disclosure, the thickness of the lubricant film can be increased as compared to a bore cutting tool without the pits.

The average pit depth is at least 5 μm, or for example, at least 8 μm. Suitably the average pit depth is no more than 50 μm, no more than 25 μm, or no more than 15 μm. A particularly average pit depth is in the range 8 μm to 25 μm. Average pit depth can be measured using white light interferometry as discussed herein.

Suitably the average pit width and average pit length are independently selected from 20 μm to 400 μm, or 40 μm to 250 μm. In the case of circular pits, the diameter is of course the width and length. Average pit width and average pit length can be measured using white light interferometry.

Suitably the average pit cross-sectional area is in the range 0.005 mm$^2$ to 1 mm$^2$. Again, this can be measured using white light interferometry.

Suitably the average pitch (centre to centre spacing) is in the range 50 μm to 350 μm, or 50 μm to 250 μm, or 50 μm to 150 μm. Again, this can be measured using white light interferometry or SEM.

Suitably the average density of the pits is in the range 5 to 50 pits/mm$^2$, 20 to 30 pits/mm$^2$ or about 24 pits/mm$^2$.

The pits can be any suitable shape, for example elongate (e.g. round ended or round cornered rectangles), circular, triangular or rectangular. It is preferred that the pits are round ended or round cornered rectangles, also referred to herein as slot-shaped pits or slots.

Suitably the plurality of pits are an array of pits. That is, the plurality of pits are suitably arranged in a non-random pattern. Suitably the spacing between adjacent pits is the same for at least the majority of, preferably substantially all of, the pits in the array. The pits can be arranged as a plurality of rows of pits, suitably with substantially equal spacing between the rows. For example, a grid pattern.

Suitably the plurality of pits are present only on at least one surface of the bore cutting tool which in use is in frictional contact with the workpiece. As explained herein, a preferred bore cutting tool is a twist drill and in twist drill embodiments the twist drill has a cylindrical land and the plurality of pits is present only on the cylindrical land. Suitably at least 50% of the cylindrical land is provided with pits, preferably substantially all of the cylindrical land is provided with pits. The present inventors have found that by providing pits on the cylindrical land of a twist drill, considerable improvements in tool performance can be achieved, as discussed in the examples herein.

The tool coating may an average thickness of at least 0.5 µm, or at least 1 µm. Suitably an upper limit for the average thickness is 10 µm, or 5 µm. The coating may have a thickness is in the range 1 µm to 5 µm.

The bore cutting tool can be partially or fully coated. The coating may be a wear resistant coating having a lower coefficient of friction than the uncoated tool.

Suitable coatings include metal nitride based coating (e.g. TiN, AlxTiyN, etc.), metal oxide based coating (e.g. AlxO, AlxCryO, etc.), carbon based coating (e.g. DLC, Diamond Coating, etc.) and combinations thereof. The tool coating may include a nitride coating, suitably a metal nitride-based coating, for example, TiAlN.

Suitable coating methods include vapour deposition, for example physical vapour deposition (PVD), or other vacuum deposition techniques, and chemical vapour deposition (CVD).

The pits can suitably be created by a laser. Suitably the pits are formed by laser etching of the tool substrate prior to forming the tool coating. For example, laser etching systems used for marking metal components can be applied to bore cutting tools to produce the desired plurality of pits.

The desired pattern of the array is programmed into the laser controller and the laser is then operated so as to provide the cutting tool with the pits according to that pattern.

Typically, the laser is moved with respect to the tool (or blank). Suitably the tool or blank is rotated. Alternatively, or additionally, the laser source is moved over the surface of the tool.

The bore cutting tool is a round tool. Suitably the bore cutting tool is selected from a twist drill, an end mill, a reamer and a tap. The bore cutting tool may be a twist drill. Suitably the twist drill is a metal working twist drill.

Whilst the bore cutting tool (e.g. twist drill) is generally for cutting metal workpieces, it can also be adapted for other workpiece materials such as composites and ceramics.

The tool substrate can be made of carbide. For example, tungsten carbide. Alternative materials include high speed steel (HSS), HSCo and HSCoXP, silicon nitride and PCD (polycrystalline diamond), or combinations thereof (for example PCD mounted on a metal body).

In a further aspect the present disclosure provides a method of making a bore cutting tool having a plurality of pits on a surface of the bore cutting tool, the method comprising the steps of forming a plurality of pits in the surface of a tool substrate, and coating the pitted surface of the tool substrate to form a tool coating, wherein the tool coating follows the contour of each of the plurality of pits.

The preferred pit dimensions, pit geometry and pattern of pits discussed above with respect to the first aspect also apply to this aspect as method steps of forming the pits.

Similarly, the method may be a method of making a twist drill.

Suitably the step of forming pits is a step of forming pits by laser etching of the tool substrate.

Suitably the step of forming the plurality of pits includes forming pits in a tool blank and machining the blank to form the tool substrate.

Suitably the method includes the step of cleaning the surface in which the pits are formed, for example to remove flash. The cleaning step includes an outer diameter grind.

Further, a method of making a bore cutting tool having a plurality of pits in a surface of the bore cutting tool is provided, the method including the steps of forming the plurality of pits in a surface of a bore cutting tool blank and machining the blank to form the bore cutting tool.

The pit dimensions, pit geometry and pattern of pits discussed above with respect to the first aspect also apply to this proposal as method steps of forming the pits.

Suitably the method includes the step of cleaning the surface in which the pits are formed, for example to remove flash. Preferably the cleaning step comprises an outer diameter grind.

Suitably the method includes the step of coating the bore cutting tool to form a tool coating.

Suitably the bore cutting tool is a twist drill and the step of machining the blank includes machining at least one flute. Suitably the bore cutting tool is a twist drill having a cylindrical land, and the step of machining the blank includes machining the blank so as to provide the cylindrical land, which cylindrical land comprises a plurality of pits.

As with the previous aspect, the pits are formed by laser etching.

A method for making a coated bore cutting tool including pits in a surface of the tool is as follows:
(1) Grind the tool rods (e.g. carbide rods) to the required tool (e.g. drill) blank geometry;
(2) Apply the required pit pattern to the blank (e.g. using a laser);
(3) Remove flash generated in step (2)
(4) Grind the patterned blank to the required tool geometry ensuring the desired patterned area remains present; and
(5) Coat the tool with the required coating (e.g. by vapour deposition).

There is also proposed an alternative method of making a bore cutting tool having a plurality of pits in a surface of the bore cutting tool, the method comprising the step of forming the plurality of pits using a laser.

The pit dimensions, pit geometry and pattern of pits discussed above with respect to the first aspect also apply to this proposal as method steps of forming the pits.

Suitably the method includes the step of cleaning the surface in which the pits are formed, for example to remove flash. Preferably the cleaning step comprises an outer diameter grind.

Further proposals include a method of making a bore cutting tool having a plurality of pits in a surface of the bore cutting tool, the method including the steps of forming an array of pits in the surface of the bore cutting tool.

In embodiments, a regular pattern (array) of pits rather than a random pattern may enable a smaller area to contain more coolant reservoirs, thus generating increased areas of hydrodynamic lubrication. In embodiments, this may reduce the average µ of the surfaces in contact thus reducing the wear experienced by the tool leading to extended tool life and improved hole quality.

The pit dimensions, pit geometry and pattern of pits discussed above with respect to the first aspect also apply to this aspect as method steps of forming the pits.

Suitably the step of forming the pits includes forming the pits using a laser.

Suitably the method includes the step of cleaning the surface in which the pits are formed, for example to remove flash. The cleaning step can include an outer diameter grind.

The array of pits may include a plurality of regularly spaced rows of pits.

A bore cutting tool having an array of pits in the surface of the bore cutting tool is disclosed.

The pit dimensions, pit geometry and pattern of pits discussed above with respect to the first aspect also apply to this aspect as method steps of forming the pits.

Suitably the array of pits comprises a plurality of regularly spaced rows of pits.

The present disclosure proposes the use of a laser to form a plurality of pits in a bore cutting tool.

There is a further method proposed of coating a bore cutting tool, wherein the bore cutting tool includes a plurality of pits in a surface of the bore cutting tool such that the coating is applied to the pitted surface.

The present disclosure proposes a method of cutting a workpiece using a bore cutting tool as described herein.

The workpiece can be a metal workpiece, for example, a titanium or titanium alloy workpiece, such as AMG 4.3 (Ti-6 Al-4V).

The bore cutting tool may be a twist drill and the method a method of drilling a workpiece.

The method may include applying lubrication, suitably minimum quantity lubrication (MQL). The application of a plurality of pits to a bore cutting tool as described herein can bring particular benefits when MQL is used by optimizing the comparatively small amounts of lubricant that are used.

The present disclosure provides a bore cutting tool made by any one of the methods disclosed herein.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

FIGS. 1A and 1B show a cross-section of a pit including a coated surface.

FIG. 2 shows a tool blank (twist drill blank) to which an array of pits is applied in the hatched area.

DETAILED DESCRIPTION

Figure 3:
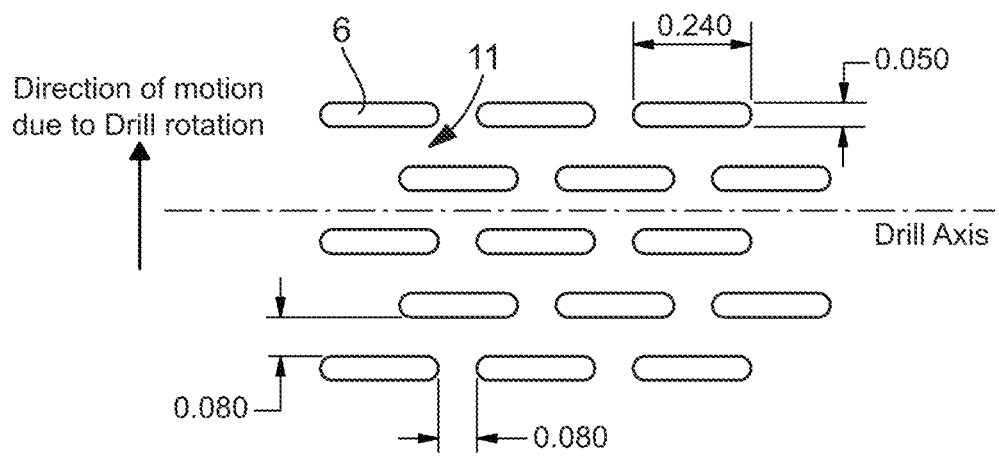
FIG. 3 shows a pattern of pits applied to a tool blank, the pits having an elongate "slot" shape.

The term "pit" as used herein refers to a closed-end pore or blind hole. The pit dimensions are as described herein.

The term "bore cutting tool" as used herein refers to a cutting tool adapted to cut a workpiece so as to form a bore, including reshaping or modifying an existing bore (whether or not other types of cutting or removal of workpiece material can also be performed by the tool). For example, a class of bore cutting tools is round tools. Round tools include twist drills, end mills, reamers and taps. Twist drills are particularly preferred. Whilst any twist drill geometry can be used, a point angle may be 90° to 180°.

The term "array of pits" as used herein refers to a plurality of pits arranged in an ordered, regular or non-random pattern. An example of an array of pits is a plurality of rows of pits, with substantially equal spacing between adjacent pits and respective rows.

FIG. 1A illustrates a cross-section taken at the surface portion of a bore cutting tool 2 according to the present invention. The tool substrate 4 is provided with a pit 6, for example by laser etching. A tool coating 8 is then applied to the pitted tool substrate. The tool coating follows the contour of the pit so that the surface of the pit 10 includes the tool coating. The resultant pit has a comparatively smooth and homogenous surface. There is a smooth transition from the substantially flat main surface of the tool and the "inner" surface of the pit. When the bore cutting tool is provided with a plurality of such pits, the tool is adapted to work efficiently with lubricant (for example MQL) by retaining lubricant in the pits.

The pits, with their coated surface, are particularly effective at retaining lubricant, for example acting as reservoirs for the lubricant 20 as shown in FIG. 1B.

The thickness of the lubricant film can be increased as compared to a bore cutting tool without the pits. Suitably this generates areas of hydrodynamic lubrication where the fluid is forced into the pits as the tool surface comes into contact with the workpiece 18, as illustrated in FIG. 1B.

The average pit depth is at least 5 µm, or for example, at least 8 µm. Suitably the average pit depth is no more than 50 µm, no more than 25 µm, or no more than 15 µm. A particularly average pit depth is in the range 8 µm to 25 µm. Average pit depth can be measured using white light interferometry as discussed herein.

Suitably the average pit width and average pit length are independently selected from 20 µm to 400 µm, or 40 µm to 250 µm. In the case of circular pits, the diameter is of course the width and length. Average pit width and average pit length can be measured using white light interferometry.

Suitably the average pit cross-sectional area is in the range 0.005 mm$^2$ to 1 mm$^2$. Suitably the average pitch (centre to centre spacing) is in the range 50 µm to 350 µm, or 50 µm to 250 µm, or 50 µm to 150 µm. Suitably the average density of the pits is in the range 5 to 50 pits/mm$^2$, 20 to 30 pits/mm$^2$ or about 24 pits/mm$^2$.

The pits can be any suitable shape, for example elongate (e.g. round ended or round cornered rectangles), circular, triangular or rectangular. It is preferred that the pits are round ended or round cornered rectangles, also referred to herein as slot-shaped pits or slots.

Suitably the plurality of pits is an array of pits. That is, the plurality of pits is suitably arranged in a non-random pattern. Suitably the spacing between adjacent pits is the same for at least the majority of, preferably substantially all of, the pits in the array. The pits can be arranged as a plurality of rows of pits, suitably with substantially equal spacing between the rows. For example, a grid pattern.

Suitably the plurality of pits is present only on at least one surface of the bore cutting tool which in use is in frictional contact with the workpiece. As explained herein, a preferred bore cutting tool is a twist drill and in twist drill embodiments the twist drill has a cylindrical land and the plurality of pits is present only on the cylindrical land. Suitably at least 50% of the cylindrical land is provided with pits, preferably substantially all of the cylindrical land is provided with pits. By providing pits on the cylindrical land of a twist drill, considerable improvements in tool performance can be achieved, as discussed in the examples herein.

The tool coating may an average thickness of at least 0.5 μm, or at least 1 μm. Suitably an upper limit for the average thickness is 10 μm, or 5 μm. Thus, the coating may have a thickness is in the range 1 μm to 5 μm.

The bore cutting tool can be partially or fully coated. The coating may be a wear resistant coating having a lower coefficient of friction than the uncoated tool.

Suitable coatings include metal nitride-based coating (e.g. TiN, AlxTiyN, etc.), metal oxide based coating (e.g. AlxO, AlxCryO, etc.), carbon based coating (e.g. DLC, Diamond Coating, etc.) and combinations thereof. The tool coating may include a nitride coating, suitably a metal nitride-based coating, for example, TiAlN.

Suitable coating methods include vapour deposition, for example physical vapour deposition (PVD), or other vacuum deposition techniques, and chemical vapour deposition (CVD).

The pits can suitably be created by a laser. Suitably the pits are formed by laser etching of the tool substrate prior to forming the tool coating. For example, laser etching systems used for marking metal components can be applied to bore cutting tools to produce the desired plurality of pits.

The desired pattern of the array is programmed into the laser controller and the laser is then operated so as to provide the cutting tool with the pits according to that pattern.

Typically, the laser is moved with respect to the tool (or blank). Suitably the tool or blank is rotated. Alternatively, or additionally, the laser source is moved over the surface of the tool.

The bore cutting tool is a round tool. Suitably the bore cutting tool is selected from a twist drill, an end mill, a reamer and a tap. The bore cutting tool may be a twist drill. Suitably the twist drill is a metal working twist drill.

Whilst the bore cutting tool (e.g. twist drill) is generally for cutting metal workpieces, it can also be adapted for other workpiece materials such as composites and ceramics.

The tool substrate can be made of carbide. For example, tungsten carbide. Alternative materials include high speed steel (HSS), HSCo and HSCoXP, silicon nitride and PCD (polycrystalline diamond), or combinations thereof (for example PCD mounted on a metal body).

EXAMPLES AND TESTING

Example 1

A tungsten carbide rod was machined so as to produce a twist drill blank having a diameter of 12 mm. The blank was provided with an ordered pattern (array) of pits in the surface of the blank corresponding to the drill body, by laser etching. The area to which the pattern was applied is shown in FIG. 2. The pattern applied to the blank is shown in FIG. 3. The pattern has "slot" shaped elongate pits arranged in land 11 with their longer axis parallel to the main longitudinal axis of the drill (perpendicular to the direction of drill rotation). The pit density was programmed to be about 24 pits/mm$^2$.

Figure 4:
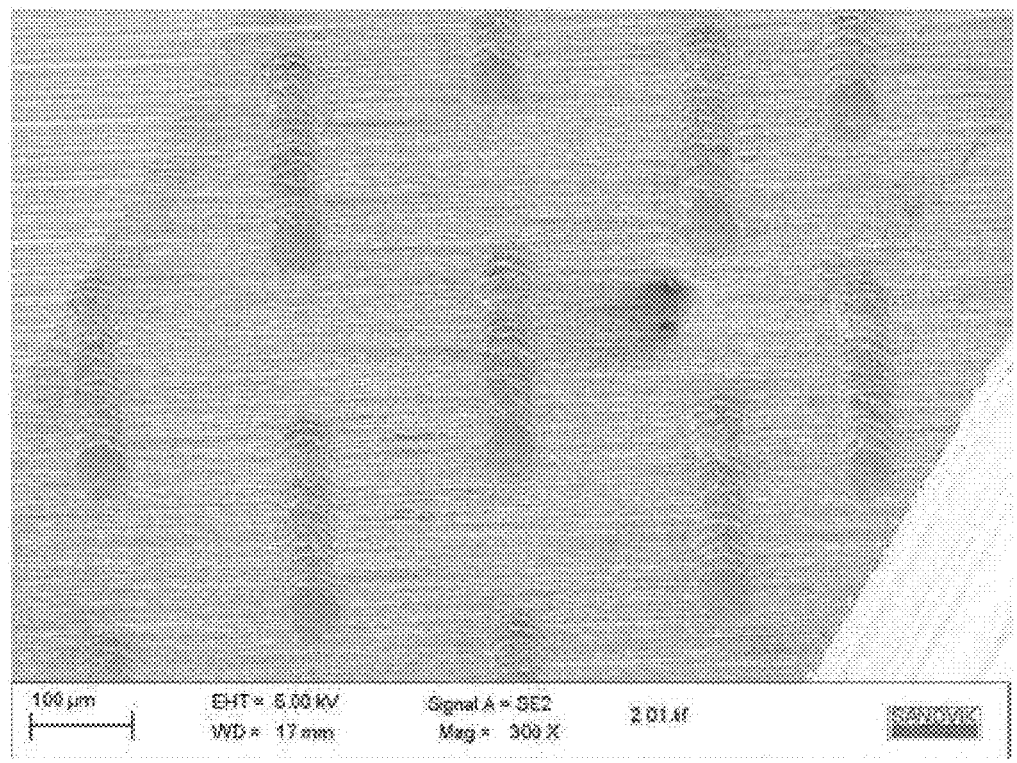
FIG. 4 shows an SEM image of a cylindrical land of a twist drill comprising an array of pits.

SEM analysis indicated that burr or flash was present around the periphery of the pits. The blanks were therefore surface cleaned using an outer diameter grind to remove the flash. The resultant pits in the tool blank surface are shown in FIG. 4, which illustrates that substantially no flash remains.

The absence of flash was confirmed by white light interferometry using a Wyko white light analyser. White light analysis permits imaging of the 3D surface of the tool. From the acquired data, cross-sections or profiles of the pits can be viewed and measurements of pit depth (at deepest point), width (at widest point) and length (at longest point) can be made, as well as cross-sectional area (at surface). An example of a pit profile across the short axis (width) of the pit is shown in FIG. 4.

The tool blank was then machined so as to produce a drill geometry corresponding to Dormer Tools' CDX R553 commercial product.

The cylindrical land is the only part of the twist drill that retains the pattern of pits. The rest of the surface of the tool blank is removed during the machining steps.

From SEM and white light analysis the following pit dimensions were obtained:
Average pit width=60 μm
Average pit depth=11 μm
Average pit length=230 μm
Average height of flash=0 μm Pit spacing was selected by appropriate programming of the laser apparatus: approx 320 μm (centre to centre in length direction) and approx 130 μm (center to center in width direction). Other center to center spacings are possible, for example 100 μm to 200 μm.

The twist drill was then coated with TiAlN using a standard deposition technique. The depth of TiAlN coating on the tool substrate was about 1 μm. The coating was applied to all of the twist drill, including the cylindrical land. The coating extends over the pits so that, in cross-section, the tool comprises pits in the tool substrate with a layer of TiAlN following the contour of the pit (e.g. as illustrated in FIGS. 1A and 1B). Other coatings can be used instead of TiAlN.

Figure 5:
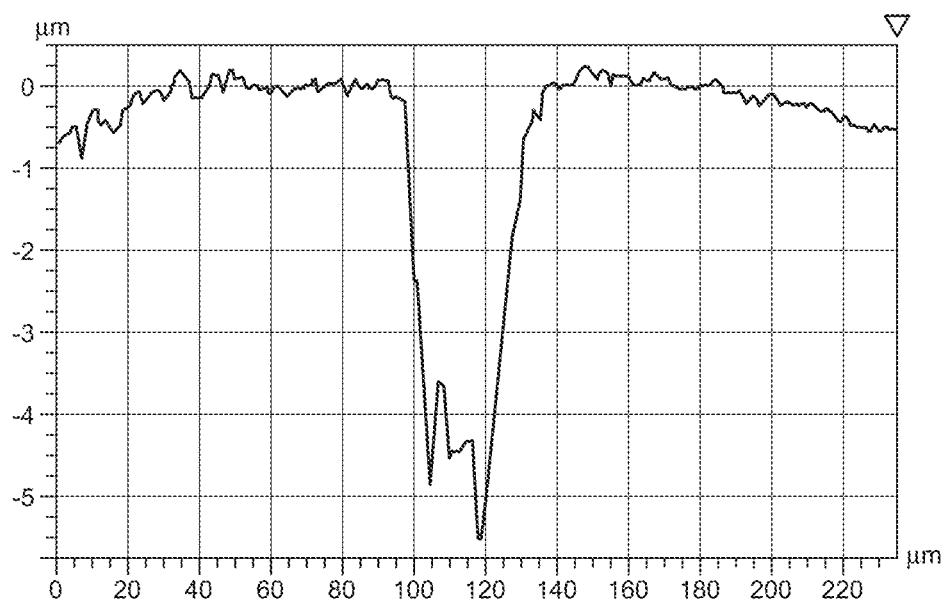
FIG. 5 shows the results of white light analysis (using a Wyko white light interferometer) of a pit presented as a cross-section or profile in the width direction (short axis of the pit).
Figure 6:
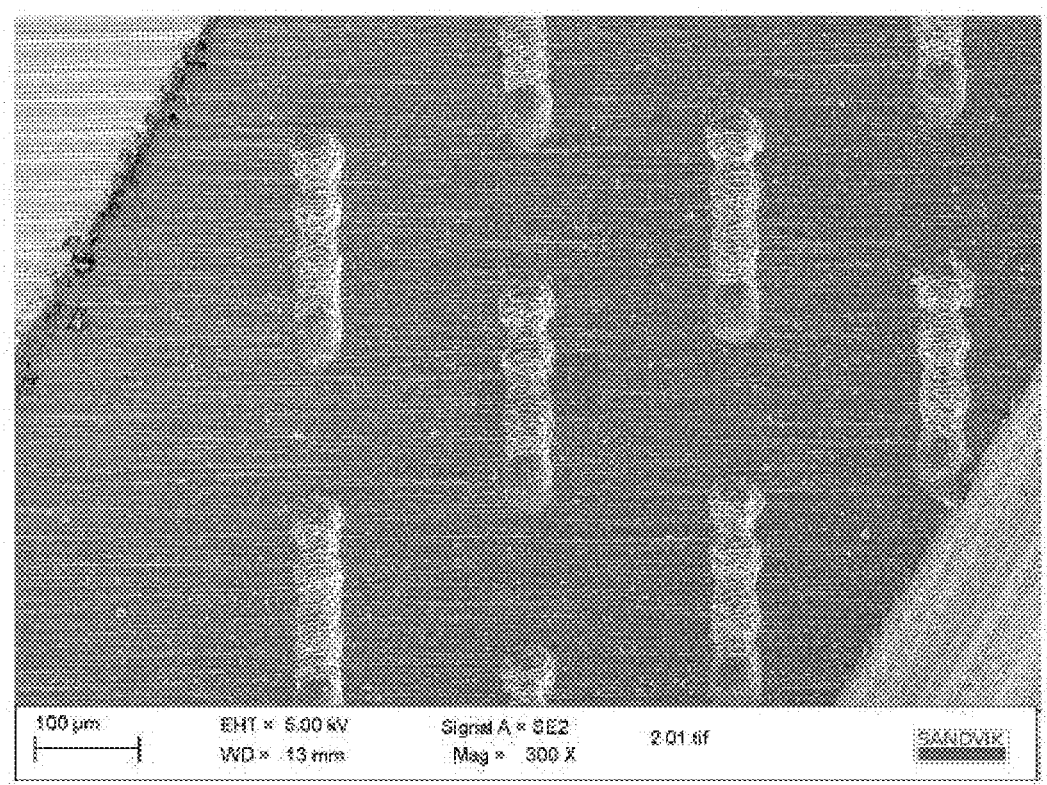
FIG. 6 is an SEM image of the pits after coating with TiAlN.
Figure 7:
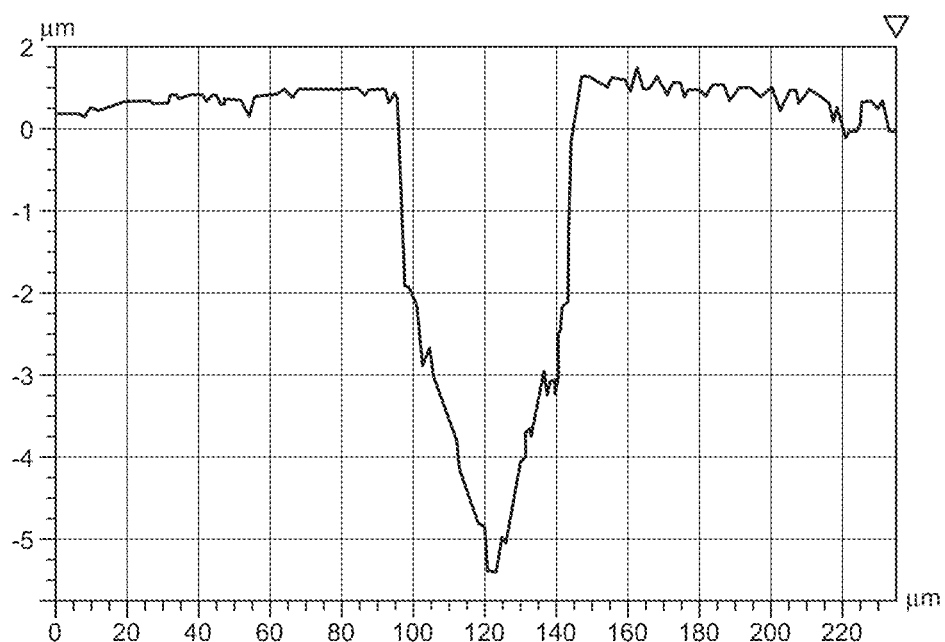
FIG. 7 shows the results of white light analysis (using a Wyko white light interferometer) of a pit presented as a cross-section or profile in the width direction (short axis of the pit).

The coated pits are shown in FIG. 5. A white light analysis width profile of a pit after coating is shown in FIG. 6.

From SEM and white light analysis after coating the following pit dimensions were obtained:
Average pit width=60 μm
Average pit depth=9 μm
Average pit length=230 μm
Average height of flash=0 μm Example 2

The same procedure as Example 1 was followed except that the laser dwelling time was slightly longer during the laser texturing step.

After coating, the average pit width was measured as 50 μm, the average pit length 220 μm and the average pit depth 11 μm.

Comparative Example 1

A twist drill without pits was made in the same way as Example 1 except laser texturing was not applied.

Tests

Examples 1 and 2 and Comparative Example 1 were tested using two workpiece materials: AMG 1.5 (steel alloy) and AMG 4.3 (Titanium alloy). AMG 4.3 is particularly demanding because drilling of Ti workpieces is known to generate high temperatures and can even cause combustion of the Ti.

The following conditions and settings were used in Test 1:
Machine: DMU-60
Material: AMG 1.5 (W No. 1.2312)
Drill geometry: R553
Diameter: 12.00 mm
Drill length: 5×diameter
Drill depth: 36 mm blind holes
Coating: TiAlN
Coolant: MQL
Number of holes: 10 holes per test per tool
Monitoring equipment: analySIS software and microscope, and Kistler Dynamometer (9123C 1011, with Dyno Wear Software) to monitor cutting thrust and torque.
Surface speed: 48 mm/min
Feed: 0.15 mm/rev
Spindle speed: 1273 rpm
Penetration rate: 190 mm/min Once the holes were completed, the holes were measured using a Renishaw probe (MP700 OMP70) at depths of 10 mm and 30 mm.

The thrust force and torque measurements showed that twist drills having an array of pits on the cylindrical land experience acceptable levels of thrust and torque.

The hole size measurements (using the Renishaw probe) showed that both of Example 1 and Example 2 produced "tighter" holes than Comparative Example 1. Indeed, both examples achieved a mean hole tolerance of H7, whereas Comparative Example 1 achieved only H9 (ISO 286 "Limits and fits").

Furthermore, good hole size reproducibility was also achieved.

The following conditions and settings were used in Test 2:
Machine: DMU-60
Material: AMG 4.3 (Ti-6 Al-4V)/ASTM B265
Drill geometry: R553
Diameter: 12.00 mm
Drill length: 5×diameter
Drill depth: 14 mm through holes
Coating: TiAlN
Coolant: MQL
Number of holes: 3 holes per test per tool
Monitoring equipment: analySIS software and microscope and Kistler Dynamometer (to monitor cutting thrust and torque)
Surface speed: 25 mm/min
Feed: 0.135 mm/rev
Spindle speed: 663 rpm
Penetration rate: 90 mm/min Once the holes were completed, the holes were measured using the Renishaw probe at depths of 5 mm and 10 mm.

The thrust force and torque measurements showed that twist drills comprising an array of pits on the cylindrical land experience acceptable levels of thrust and torque in the Ti workpiece. Indeed, the torque levels experienced in Ti were significantly lower for Examples 1 and 2 as compared to Comparative Example 1.

The hole size measurements (using the Renishaw probe) showed that both of Example 1 and Example 2 produced "tighter" holes than Comparative Example 1 when used in the Ti workpiece. Furthermore, particularly at a depth of 5 mm, the spread of hole size is smaller for Examples 1 and 2 as compared to Comparative Example 1.

The consistent hole sizes achieved by the laser textured tools indicate that the laser textured tools are reducing the frictional properties of the tool. In particular, the excellent hole size spread at 5 mm suggests that the work piece material begins to cool and restore its original shape, thus minimising the possibility of "snatching". In particular, the reduction in the heat generation can reduce the extent of expansion of the workpiece material thus reducing the "closing in" of the hole on the tool, which effect can cause "grabbing" of "snatching" of the tool.

The test results demonstrate that excellent hole quality can be achieved, particularly in the case of a Ti workpiece.

Furthermore, especially in the case of the challenging Ti workpiece, a reduced torque value is experienced. This indicates that the tool is under less stress, potentially leading to improved tool life with concomitant improvements in tool productivity. The reduction in torque may also permit reduced power consumption, thus generating savings in machine overheads and of course benefitting the environment.

Furthermore, the results show that laser textured tools may be particularly suitable for use with minimum quantity lubrication (MQL) because they optimise the use of the comparatively small amounts of lubricant which are applied to the tool and workpiece in MQL. This permits a reduction in the environmental impact as a result of reduced waste lubricant and a reduction in the cost for the disposal or reclamation of lubricant.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. A bore cutting tool comprising:
    a tool substrate, the tool substrate having an upper surface;
    a tool coating disposed on the upper surface of the tool substrate, the coating having an uppermost surface; and
    a plurality of pits formed in and spaced along the upper surface of the tool substrate in an array, such that the plurality of pits are arranged in a plurality of rows and columns with the pits being spaced along the rows and columns, wherein the tool coating extends over the plurality of pits such that the coating follows a contour of each of the plurality of pits to form a plurality of coated pits and over spaces between the plurality of pits, the uppermost surface of the tool coating in the plurality of coated pits extending below the upper surface of the tool substrate at the spaces between the plurality of pits and the tool coating having a thickness that is less than a depth of each respective coated pit of the plurality of coated pits to form a reservoir in each of the plurality of coated pits, the reservoirs being arranged to retain lubricant, the depth extending from the uppermost surface of the tool coating between the plurality of coated pits to the uppermost surface of the tool coating in the plurality of coated pits, wherein an average pit depth is in the range of 8 μm to 25 μm.

2. The bore cutting tool according to claim 1, wherein an average pit cross-sectional area of each of the plurality of pits is about 0.005 mm$^2$ to less than 1 mm$^2$.

3. The bore cutting tool according to claim 1, wherein the plurality of pits is present only on one surface of the bore cutting tool.

4. The bore cutting tool according to claim 1, wherein the bore cutting tool is a twist drill having a cylindrical land and the plurality of pits is disposed on the cylindrical land.

5. The bore cutting tool according to claim 1, wherein the tool coating has an average thickness of about 1 μm to about 5 μm.

6. The bore cutting tool according to claim 1, wherein the tool coating comprises TiAlN.

7. The bore cutting tool according to claim 1, wherein the plurality of pits is formed by laser etching or electron beam etching of the tool substrate prior to forming the tool coating.

8. A method of making a bore cutting tool, the method comprising the steps of:
   providing a tool substrate, the tool substrate having an upper surface;
   providing a tool coating disposed on the upper surface of the tool substrate, the coating having an uppermost surface; and
   forming a plurality of pits in and spaced along the upper surface of the tool substrate in an array, such that the plurality of pits are arranged in a plurality of rows and columns with the pits being spaced along the rows and columns, wherein the tool coating extends over the plurality of pits such that the coating follows a contour of each of the plurality of pits to form a plurality of coated pits and over spaces between the plurality of pits, the uppermost surface of the tool coating in the plurality of coated pits extending below the upper surface of the tool substrate at the spaces between the plurality of pits and the tool coating having a thickness that is less than a depth of each respective coated pit of the plurality of coated pits to form a reservoir in each of the plurality of coated pits, the reservoirs being arranged to retain lubricant, the depth extending from the uppermost surface of the tool coating between the plurality of coated pits to the uppermost surface of the tool coating in the plurality of coated pits, wherein an average pit depth is in the range of 8 μm to 25 μm.

9. The method according to claim 8, wherein an average pit cross-sectional area of each of the plurality of pits is about 0.005 mm$^2$ to less than 1 mm$^2$.

10. The method according to claim 8, wherein the bore cutting tool is a twist drill having a cylindrical land and the plurality of pits is disposed only on the cylindrical land.

11. The method according to claim 8, wherein the tool coating has an average thickness of about 1 μm to about 5 μm.

12. The method according to claim 8, wherein the tool coating comprises TiAlN.

13. The method according to claim 8, wherein the plurality of pits is formed by laser etching or electron beam etching of the tool substrate.

* * * * *